United States Patent [19]
Edme et al.

[11] 3,769,851
[45] Nov. 6, 1973

[54] ENERGY ABSORBING DEVICE AND SAFETY STEERING COLUMN FOR A VEHICLE EQUIPPED WITH THE DEVICE

[75] Inventors: Georges Edme, Audincourt; Robert Fichot; Georges Oberle, both of Montbeliard, all of France

[73] Assignee: Automobiles Peugeot, Paris; Regie Nationale Des Usines Renault, Billancourt, both of France

[22] Filed: May 15, 1972

[21] Appl. No.: 253,513

[30] Foreign Application Priority Data
June 7, 1971   France ............................ 7120562

[52] U.S. Cl. ................................. 74/492, 188/1 C
[51] Int. Cl. ............................................. B62d 1/18
[58] Field of Search ........................... 74/492, 393; 188/1 C

[56] References Cited
UNITED STATES PATENTS

| | | |
|---|---|---|
| 3,457,800 | 7/1969 | Toshida et al. ........................ 74/492 |
| 2,877,170 | 3/1959 | Greenhalgh et al. ............. 188/1 C X |
| 3,392,599 | 7/1968 | White ................................. 74/492 |
| 3,394,612 | 7/1968 | Bogosoff et al. ..................... 74/492 |
| 3,492,888 | 2/1970 | Nishimura et al. .................... 74/492 |
| 3,538,785 | 11/1970 | Grancon ............................. 74/492 |
| 3,703,106 | 11/1972 | Arntson .............................. 74/492 |

FOREIGN PATENTS OR APPLICATIONS
905,836   9/1962   Great Britain ..................... 188/1 C Primary Examiner—Allan D. Herrmann
Attorney—Robert S. Swecker

[57] ABSTRACT

Energy absorbing device operating by plastic deformation, for example for a vehicle steering column, comprising a first element having a slot and a second element carrying a projecting member disposed beyond one end of the slot. The width of the projecting member is greater than the width of the slot so as to deform the edge portions of the slot upon relative movement between the elements.

12 Claims, 6 Drawing Figures

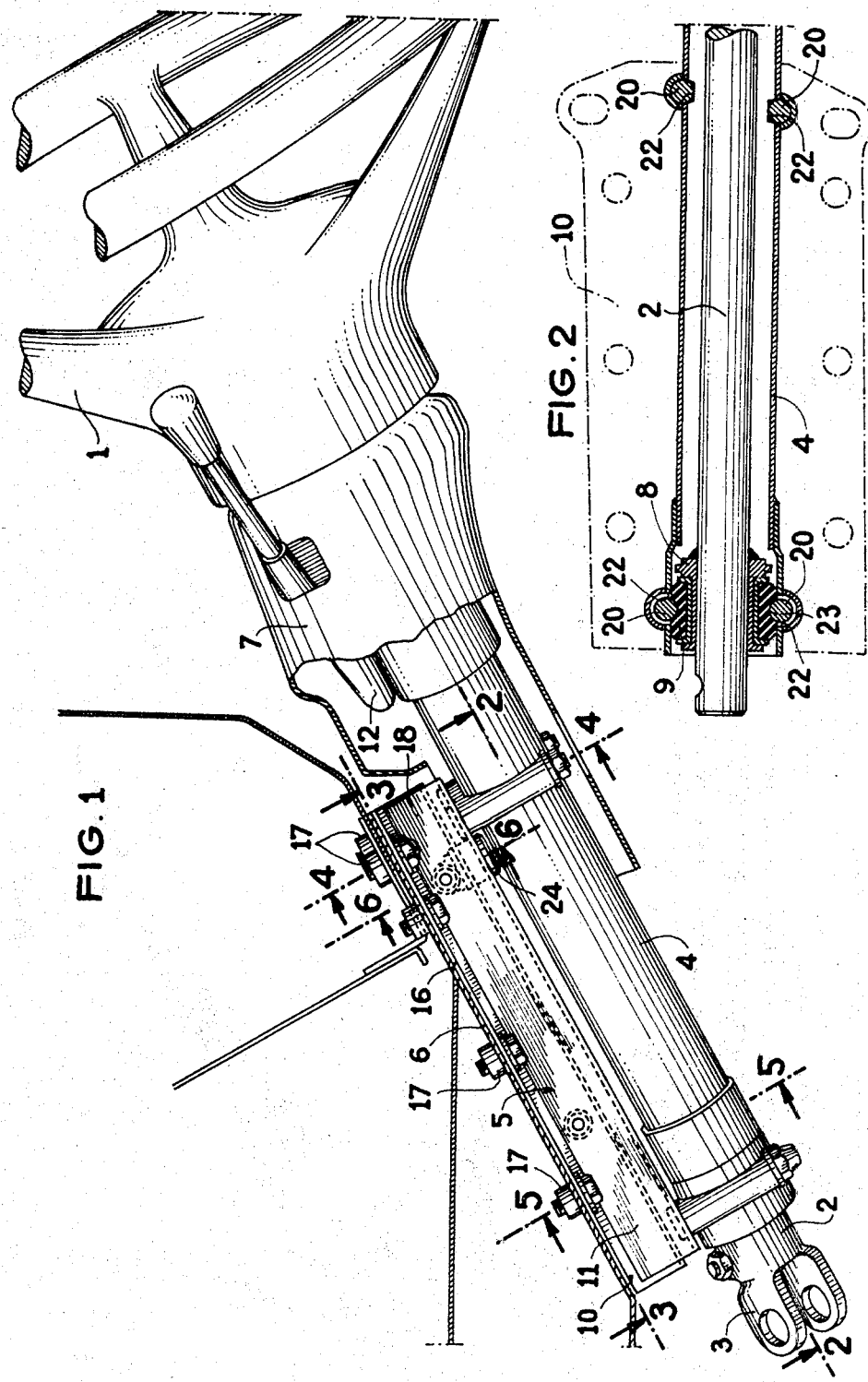

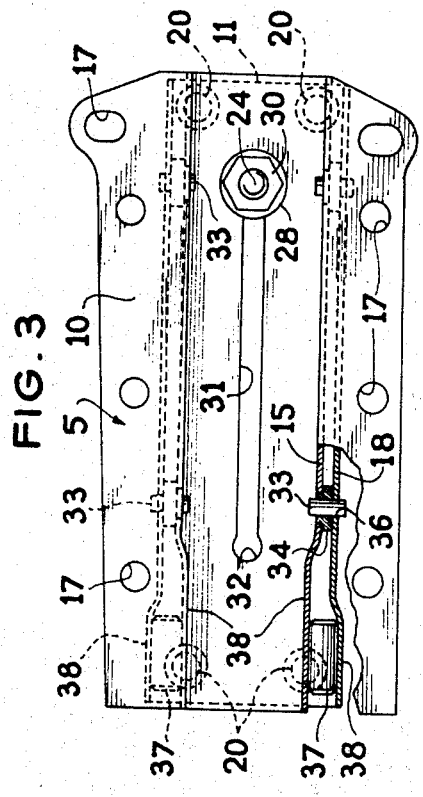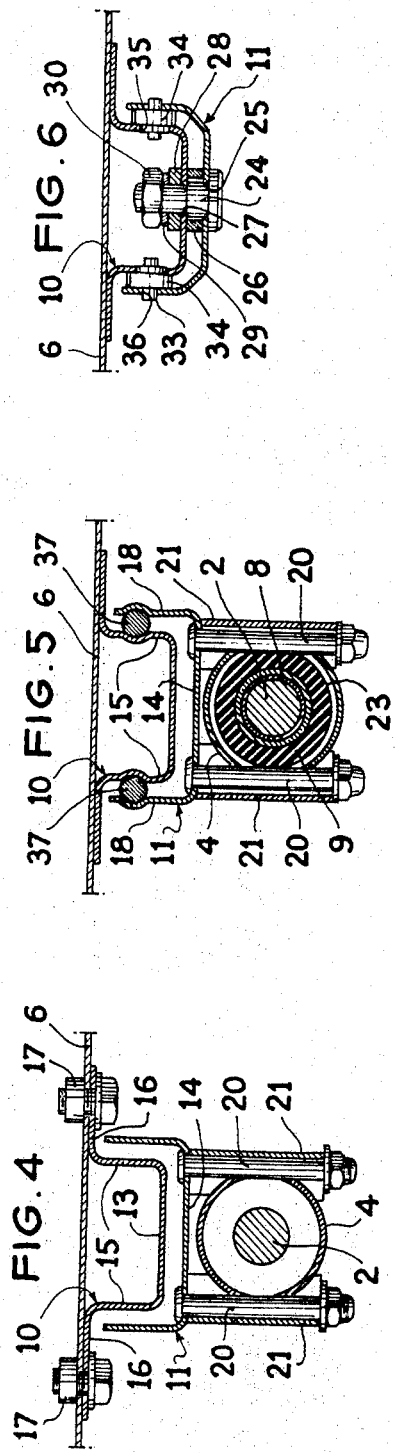

ENERGY ABSORBING DEVICE AND SAFETY STEERING COLUMN FOR A VEHICLE EQUIPPED WITH THE DEVICE

The present invention relates to an energy absorbing device capable of allowing a certain displacement between the various component parts under the action of a force, such as that due to impact.

Devices are known which are telescopic, that is to say, they comprise two cylindrical elements capable of sliding with respect to each other and a resiliently yieldable material sometimes interposed between these elements. These devices have the drawback of being operative practically only when the force applied is oriented substantially along the direction of sliding. In the case of forces having a notable transverse component these devices become wedged.

Devices have therefore been proposed in which there is interposed between the component parts capable of moving with respect to each other an element which is deformable beyond a given applied force. Such a device is for example disclosed in French Patent Application No. 69,18,803 filed by the Applicants. This type of device has the advantage of being operative in all cases without wedging.

However, in these devices as the energy is absorbed by plastic deformation of the deformable element, it is difficult to govern suitably the magnitude of the force which must bring about this deformation and it is practically impossible to maintain this force constant throughout the travel of the relatively moving parts. They are moreover of relatively complicated structure and therefore expensive.

An object of the invention is to provide an energy absorbing device which operates by the plastic deformation of a material which overcomes these various drawbacks. which operates by plastic deformation, comprising two elements in one of which is formed a slot the other element having a projecting member disposed beyond one of the ends of the slot and on the axis of the slot, and width of the projecting member being greater than that of the slot.

Thus, in the event of a force tending to displace the two elements with respect to each other, as soon as this force exceeds a given magnitude, the projecting member is constrained to travel along the slot by urging apart the edge portions or lips of the slot, the corresponding plastic deformation absorbing the required energy and dissipating it without restoration. The magnitude of the force required to cause this deformation is perfectly determined and it is constant throughout the travel. The device is moreover relatively simple and cheap to make.

The invention also relates to the application of the device of this type to a safety steering column for a vehicle and in particular an automobile vehicle.

Another object of the invention is to provide a steering column equipped with such a device wherein one of the two elements is connected in a rigid manner to the body of the vehicle whereas the other of said elements is connected in a rigid manner to the steering shaft.

Thus, in the event of a shock on the body or on the steering column, the latter can be pushed in with respect to the body owing to the relative displacement of the two elements of the device allowed by the travel of the projecting member in the slot which notably absorbs the thrust of the driver on the steering wheel.

Further features and advantages of the invention will be apparent from the ensuing description with reference to the accompanying drawings.

In the drawings:

FIG. 1 is a side elevational view of the upper part of a steering column for an automobile vehicle between the universal joint and the steering wheel, this part being connected to the body of the vehicle by a device according to one particular embodiment of the invention;

FIG. 2 is a partial sectional view of the arrangement taken on line 2—2 of FIG. 1;

FIG. 3 is a view similar to FIG. 2 but taken on lines 3—3 of FIG. 1;

FIGS. 4-6 are sectional views of the arrangement shown in FIG. 1 taken on lines 4—4, 5—5 and 6—6 respectively of FIG. 1, the first two views being in the region of the fixing points of the device to the steering column and the third in the region of the projecting member.

According to the illustrated embodiment, the steering column has a steering wheel 1 controlling the upper section of the steering shaft 2 which is connected by a universal joint 3 to a lower section of a steering shaft (not shown) and guided by a support tube 4. This tube 4 is connected, through an energy absorbing device 5 which will be described hereinafter, to a plane assembly of fixing panels 6 which pertains to the body of the vehicle and is inclined to the horizontal and parallel to the shaft section 2, the part of the assembly comprising the support tube 4 and the energy absorbing device 5 disposed adjacent the steering wheel being enclosed in a housing 7. The shaft section 2 is guided inside the tube 4 by means of an annular bearing 8 which is mounted on and welded to the lower part of the shaft section and carries an annular rubber ring 9 having the inside dimension of the tube.

The energy absorbing device 5 comprises two elements in the form of sheet metal section members 10 and 11 whose cross sections have the shape of a U. The elements 10 and 11 have the same length which is slightly less than the free length of the support tube 4 below the direction-indicating and vehicle light control 12.

These elements 10 and 11 are located one inside the other, the width of the web 13 of the upper element 10 being for this purpose less than the web 14 of the lower element 11, and they are disposed with their concave sides facing upward and their webs disposed parallel to the shaft section 2 and the body panels 6. Between the webs of these elements 10 and 11 and between their facing flanges there are disposed spacing members which will be described hereinafter. The vertical flanges 15 of the upper and inner element 10 have portions 16 which are folded outwardly in the direction parallel to the web 13 and are fastened to the body panels 6 by bolts 17 arranged along the length of the element 10. This fastening could also be achieved by welding. The vertical flanges 18 of the lower and outer element 11 terminate below the folded portions 16 of the upper element 10 and its web 14 is rigidly fixed to the support tube 4 by four bolts 20, two of which are disposed at the upper end of the web 14 and two at the lower and in the region of the bearing 8; the heads of these bolts bear against the web of the element 11 whereas their shanks extend through hollow posts 21 which are welded to the support tube 4 and are perpendicular to its axis. The tightening nuts of the bolts 20 bear against the lower ends of the posts 21. In the region of the bolts, the tube 4 has recesses 22 so that these bolts extend partly inside the tube. In particular, the two lower bolts pass through an annular recess 23 formed in the rubber ring 9 of the bearing 8 and this therefore holds the shaft 2 axially stationary relative to the tube 4.

In the vicinity of their upper ends and on their axis, the webs of the two elements 10 and 11 are made integral with each other by a bolt 24 whose head bears under the lower element 11 whereas its shank extends successively through an aperture 25 formed in the element 11, a spacer washer 26 disposed between the two webs and constituting one of the aformentioned spacer members for the elements 10 and 11, an aperture 27 in the web of the section element 10, a flat washer 28 and a stop washer 29 which receives a tightening nut 30. The head of the bolt 24 and the washer 26 therefore perform the function of spacer means for the two elements 10 and 11 in the course of relative movement therebetween. Starting from the aperture 27 there is provided in the web 13 a slot 31 which extends in the direction of the length of the web which has a width which is constant throughout its length and slightly less than the diameter of the shank of the bolt 24 which extends through the aperture 27, this slot terminating at a suitable distance from the lower end of the element 10 in the form of an abutment aperture 32 which is slightly wider than the slot. The two angles of the lower U-section element 11 are cut away in the region of the bolt 24.

The facing flanges 15 and 18 of the elements 10 and 11 are connected, substantially in the region of the two ends of the slot 31, by four shear pins 33 of polyformaldehyde which are centered in thin cylindrical studs 34 which constitute other spacer members for the elements 10 and 11. The pins 33 are engaged at one end in apertures 35 in the flanges 15 of the inner element 10 and at the other end in apertures 36 in the flanges 18 of the outer element 11. Two small-diameter cylindrical studs 37 are disposed, with their axes parallel to the longitudinal direction of the elements 10 and 11, between the facing flanges 15 and 18, these studs being received in off-set portions 38 of the flanges obtained by a local deformation of these flanges at their lower ends, these studs constituting further spacer members or guide means for the elements 10 and 11.

In the event of a shock such as that produced by a collision, the thrust of the driver of the vehicle on the steering wheel exerts an axial downward force on the steering shaft which bears against the resiliently yieldable bearing 8-9. As the latter is integral with the support tube 4 owing to effect of the lower bolts 20, the support tube 4 is also urged downwardly and this takes place first by shearing the pins 33 and then by constraining the bolt 24 to travel through the slot 31 while it urges back and separates the edge portions of the latter until it reaches the abutment aperture 32, this movement being guided laterally at the start by the two longitudinal studs 37 provided for this purpose. The deformation of the device and consequently the pushing in of the steering column, thus avoids injury to the driver by the absorption of a notable amount of energy and the dissipation of the latter without restoration.

Note that notwithstanding the deformable connection between the elements 10 and 11, this connection has a certain rigidity.

Having now described our invention what We claim as new and desire to secure by Letters Patent is:

1. An energy absorbing device operating by plastic deformation, comprising a first element defining an opening including a slot extending in a given path ,a second element in spaced relation to the first element ,projecting means on the second element disposed in the extension of said path beyond one end of the slot for penetration in the slot upon relative movement between the elements in a direction parallel to said path ,the width of the projecting means being greater than the width of the slot whereby said relative movement is accompanied by plastic deformation of the first element, spacer means for maintaining the two elements in spaced relation to each other and for guiding the two elements in said relative movement while allowing angular displacement between the two elements.

2. A device as claimed in claim 1, wherein the first element has a portion in the form of a flat plate, the slot being a throughway slot in the plate.

3. A device as claimed in claim 1, wherein said opening defines an aperture at said one end of the slot , which aperture opens into the slot and the projecting means extends into said aperture ,the guide means comprising the projecting means, an enlarged head on the projecting means in retaining engagement with the first element and spacer means combined with the projecting means and interposed between the first element and second element.

4. A device as claimed in claim 1, wherein the projecting means comprises a cylindrical member, the opening includes a first aperture opening into the slot and the second element has means defining a second aperture aligned with said first aperture and the cylindrical member extends through the apertures and is secured to the second element and has an enlarged head retaining the first element and a washer on the member is interposed between the first element and second element to maintain the two elements in spaced relation.

5. A safety steering column for a vehicle having a body, the steering column comprising a steering shaft, an energy absorbing device operating by plastic deformation and comprising a first element defining an opening including a slot extending in a given path ,a second element in spaced relation to the first element ,projecting means on the second element disposed beyond one end of the slot for penetration in the slot upon relative movement between the elements in a direction parallel to said path ,the width of the projecting means being greater than the width of the slot whereby said relative movement is accompanied by plastic deformation of the first element, spacer means for maintaining the two elements in spaced relation to each other and for guiding the two elements in said relative movement while allowing angular displacement between the two elements ,one of the two elements being connected in a rigid manner to the body of the vehicle and the other element being connected to the steering shaft to move axially with the steering shaft.

6. A steering column as claimed in claim 5, wherein the two elements are of sheet material and have a generally U-shaped section transverse to said path and one element is disposed inside the other and constitutes an inner element whereas the other element constitutes an outer element, the U-shaped section defining in each element a web portion and two flanges, the flanges of one of the elements being free to deform transversely of said path.

7. A steering column as claimed in claim 6, wherein the flanges of the inner element have portions which extend outwardly, the inner element being fixed to the body of the vehicle by said outwardly extending portions whereas the outer element is connected to the steering shaft of the vehicle by the web portion of the outer element.

8. A safety steering column structure for a vehicle which has a body, the steering column structure comprising a steering shaft and an energy absorbing device which comprises a first generally U-sectioned element, a second generally U-sectioned element, one element being disposed inside the other element in spaced relation to said other element and movable relative to said other element in a given direction transverse to said U-sections, spacer means interposed between the two elements to maintain the elements in spaced relation to each other in directions transverse to said given direction but allowing a relative movement between the elements in said given direction, the first element defining an elongate opening including a slot extending in a direction parallel to said given direction, projecting means carried by the second element and located beyond one end of the slot in a position for penetration in the slot upon said relative movement in said given direction, the width of the projecting means being greater than the width of the slot so as to widen the slot by plastic deformation of the first element and thereby absorb energy upon said relative movement, one of the elements being connected rigidly to said body and the other of the elements being connected to the steering shaft to move axially with the steering shaft upon movement of the shaft due to application of a predetermined force on the steering shaft.

9. A steering column as claimed in claim 8, comprising a ring of resiliently yieldable material, a bearing mounting the ring on the steering shaft, and screws extending through the ring, the element connected to the steering shaft being connected to the steering shaft by said screws.

10. A steering column as claimed in claim 8, comprising elongated guiding elements extending in a direction substantially parallel to said path between the U-section elements, confronting offset portions in the two U-section elements engaging the guiding elements for guiding the elements in said path.

11. An energy absorbing device comprising a first element defining an opening including a slot which extends in a given path, a second element in spaced relation to the first element and movable relative to the first element in a direction parallel to said path, a projecting member carried by the second element and located in the extension of said path beyond one end of the slot for penetration in the slot upon relative movement between the two elements in a direction parallel to said path, the width of the projecting member being greater than the width of the slot whereby said relative movement is accompanied by plastic deformation of the first element, spacer means for maintaining the two elements in spaced relation to each other and for guiding the two elements in said relative movement while allowing angular displacement between the two elements, and shearable means for ordinarily holding the two elements assembled in a fixed relative position, the shearable means being capable of shearing when a force is exerted on one of the elements which is beyond a threshold value beyond which energy must be absorbed by the device.

12. A device ao claimed in claim 11, wherein the first element has a first wall portion defining the opening and a second wall portion at an angle to the first wall portion and extending in a direction parallel to said path and the second element has a wall portion extending in a direction parallel to said path, the spacer means being interposed between and engaging said second wall portion and the wall portion of the second element.

* * * * *